(12) United States Patent
Suzuki et al.

(10) Patent No.: US 8,048,362 B2
(45) Date of Patent: *Nov. 1, 2011

(54) POLYOLEFIN-BASED RESIN COMPOSITION AND USE THEREOF

(75) Inventors: Kenji Suzuki, Ibaraki (JP); Kenji Shachi, Ibaraki (JP); Mizuho Maeda, Ibaraki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 1032 days.

This patent is subject to a terminal disclaimer.

(21) Appl. No.: 10/531,990

(22) PCT Filed: Oct. 20, 2003

(86) PCT No.: PCT/JP03/13376
§ 371 (c)(1),
(2), (4) Date: Apr. 20, 2005

(87) PCT Pub. No.: WO2004/037918
PCT Pub. Date: May 6, 2004

(65) Prior Publication Data
US 2005/0256264 A1 Nov. 17, 2005

(30) Foreign Application Priority Data
Oct. 22, 2002 (JP) .................. 2002-307541

(51) Int. Cl.
*C08J 3/28* (2006.01)
*C08L 53/00* (2006.01)
*B29C 35/00* (2006.01)

(52) U.S. Cl. ........ 264/494; 264/496; 522/111; 522/112; 525/95; 525/98

(58) Field of Classification Search .......... 522/109–112; 525/95–98; 264/494, 496
See application file for complete search history.

(56) References Cited

U.S. PATENT DOCUMENTS

| | | | | |
|---|---|---|---|---|
| 4,172,929 A | * | 10/1979 | Cooper et al. ................. | 521/139 |
| 4,588,777 A | * | 5/1986 | Hotta ............................... | 525/93 |
| 5,376,503 A | * | 12/1994 | Audett et al. .............. | 430/270.1 |
| 6,437,014 B1 | * | 8/2002 | Ho et al. .......................... | 522/75 |
| 7,449,518 B2 | * | 11/2008 | Bening et al. ................... | 525/98 |
| 2004/0132907 A1 | | 7/2004 | Nakamura et al. | |
| 2010/0152386 A1 | * | 6/2010 | Miwa et al. ...................... | 525/98 |

FOREIGN PATENT DOCUMENTS

| | | | |
|---|---|---|---|
| EP | 0 013 139 | * | 7/1980 |
| EP | 0 224 389 | | 6/1987 |
| EP | 0 881 258 | | 12/1998 |
| EP | 1 923 425 A1 | | 5/2008 |
| JP | 7-252397 | | 10/1995 |
| JP | 10-147671 | | 6/1998 |
| JP | 11-60835 | | 3/1999 |
| JP | 11-130921 | | 5/1999 |
| WO | WO 96/23818 | | 8/1996 |
| WO | WO 01/90818 A1 | * | 11/2001 |

OTHER PUBLICATIONS

Machine transalation from PAJ website of JP Publication 11-130921, May 1999.*
Machine transalation from PAJ website of JP Publication 11-060835, Mar. 1999.*
Derwent Publications, AN 1999-232739, XP-002425853, JP 11-060835, Mar. 5, 1999 (JP 11-060835 previously filed on Apr. 20, 2005).

* cited by examiner

*Primary Examiner* — Susan W Berman
(74) *Attorney, Agent, or Firm* — Oblon, Spivak, McClelland, Maier & Neustadt, L.L.P.

(57) ABSTRACT

A polyolefin-based resin composition of the invention has an addition polymerization-based block copolymer (I) and a polyolefin-based resin (II). The addition polymerization-based block copolymer (I) is selected from block copolymers comprising at least one polymer block A and at least one polymer block B, and the hydrogenated products thereof. The polymer block A comprises an aromatic vinyl compound unit comprising at least 1% by mass of an alkylstyrene-derived structural unit (a), in which at least one alkyl group having 1 to 8 carbon atoms is bound to a benzene ring. The polymer block B comprises a conjugated diene compound unit. A moiety of polymer block A can undergo crosslinking upon exposure to an active energy ray. After being molded into a desired shape, the composition is exposed to an active energy ray to carry out the crosslinking reaction. The composition exhibits flexibility, heat resistance, mechanical properties and solvent resistance in a well-balanced manner.

20 Claims, No Drawings

POLYOLEFIN-BASED RESIN COMPOSITION AND USE THEREOF

TECHNICAL FIELD

The present invention relates to a polyolefin-based resin composition. The polyolefin-based resin composition of the present invention is flexible, yet exhibits heat resistance, mechanical properties, and solvent resistance in a well-balanced manner, and is thus suitable for use in wire coatings, coatings of various cables, tubes, films, sheets, and various other applications.

BACKGROUND ART

Polyolefin-based resins generally show moderate heat resistance and high solvent resistance. This feature makes the compounds suitable for use in a wide range of applications, including wire coatings; cable coatings; tubes; films, such as laminate films, agricultural films, stretch wrapping films, adhesive films, and medical films; sheets, such as agricultural sheets; processed paper; injection molding; pipes; bundling tapes; flat yarns; and fibers. Nonetheless, as far as such applications as wire coatings, tubes, films, and sheets are concerned, further improvements are required in certain physical properties of polyolefin-based resins, including heat resistance and solvent resistance.

The following several methods or techniques have been proposed in an effort to impart required mechanical properties, heat resistance and solvent resistance to the polyolefin-based resins. In a method <1>, a crosslinkable polymer composition composed of a polyolefin-based resin and a crosslinkable monomer is exposed to an active energy ray (Japanese Patent Laid-Open Publication No. Hei 10-147671). In another method <2>, polyethylene is blended with an ethylene-α-olefin copolymer or a styrene-based block copolymer (Japanese Patent Laid-Open Publication No. Hei 11-130921).

Also, in a technique <3>, a polyethylene resin composition that undergoes crosslinking upon exposure to electron beam has been proposed. This composition is composed of a polyethylene and a highly crosslinkable ethylene copolymer obtained by copolymerization of a non-conjugated diene having 8 or more carbon atoms (Japanese Patent Laid-Open Publication No. Hei 7-48482). In a technique <4>, a molded article has also been proposed that comprises an ethylene interpolymer (preferably, uniformly branched ethylene polymer) copolymerized with at least one other monomers and that is formed by curing, irradiating, or crosslinking the ethylene polymer (National Publication of PCT application No. 2002-515530). In a method <5>, also proposed is a crosslinked composition containing silane-modified polyolefins and polypropylenes (International Patent Publication No. WO 01/038433).

Furthermore, in a technique <6>, a method for producing a particular elastomer has been proposed. In this method, a composition containing an ethylene-propylene rubber, a crystalline polymer (preferably, polyethylene) and an inorganic filler is exposed to an ionizing radiation to cause the composition to undergo crosslinking and thus form the elastomer (Japanese Patent Laid-Open Publication No. Sho 51-59981). In a technique <7>, a composition has also been proposed that has been improved in its properties such as oil-resistance, cut-through property, thermal deformation, and solder resistance. This composition is obtained by crosslinking a particular crosslinkable resin composition either chemically or by exposure to an electron beam. The crosslinkable resin composition is composed of a styrene-ethylene/butylene-styrene block copolymer, a polypropylene, an oil, a stabilizer, and a crosslinking aid (Japanese Patent Laid-Open Publication No. 58-145751). In a technique <8>, a heat-resistant and flame-resistant crosslinkable polyethylene composition has been proposed that is obtained by causing a particular composition to undergo crosslinking either chemically or by exposure to an electron beam. The composition is composed of a polyethylene, a styrene-ethylene/butylene-styrene block copolymer, and a flame retardant (Japanese Patent Laid-Open Publication No. Sho 59-105040).

However, the method <1>, which involves addition of a crosslinkable monomer and irradiation with an active energy ray, cannot necessarily provide the resulting crosslinkable polymer composition with sufficient heat resistance or solvent resistance. In the method <2>, in which a polyethylene is mixed with an ethylene-α-olefin copolymer or a styrene-based block copolymer, the addition of ethylene-α-olefin copolymer does not significantly improve the heat resistance of the resulting resin, while the addition of styrene-based block copolymer often results in a reduced solvent resistance of the resin. Thus, the method is not appropriate when it is desired to obtain a composition that exhibits flexibility and heat resistance in a well-balanced manner.

Although each of the techniques <3> through <5> is effective in facilitating crosslinking of the resin, as well as in improving the heat resistance of the resin, none is effective in improving the flexibility of the resin and is thus suitable for applications that require high flexibility.

Involving an ethylene-propylene copolymer rubber or a styrene-ethylene/butylene-styrene block copolymer as an elastic component, the techniques <6> through (8) are each effective to some extent in increasing the flexibility of the resin. However, each of these techniques fails to impart sufficient crosslinkability and, thus, heat resistance to the resin and is not suitable for use in applications that require high heat resistance, such as wire coatings intended for use in the engine room of automobiles.

For these reasons, a demand exists for a polyolefin-based resin composition that exhibits flexibility, mechanical properties, heat resistance, and solvent resistance in a well-balanced manner and is thus suitable for use in applications such as wire coatings, cable coatings, tubes, films, and sheets.

DISCLOSURE OF THE INVENTION

In view of the above-described drawbacks of conventional technologies, it is an object of the present invention to provide a polyolefin-based resin composition that exhibits flexibility, heat resistance, mechanical properties, and solvent resistance in a well-balanced manner.

The present invention achieves this object by providing the following compositions, articles and laminates.

(1) A polyolefin-based resin composition, containing an addition polymerization-based block copolymer (I) and a polyolefin-based resin (II), wherein:

the addition polymerization-based block copolymer (I) is selected from block copolymers comprising at least one polymer block A and at least one polymer block B, and the hydrogenated products thereof;

the polymer block A essentially comprises an aromatic vinyl compound unit containing at least 1% by mass of an alkylstyrene-derived structural unit (a) (which may be referred to simply as "structural unit (a)," hereinafter) in which at least one alkyl group having 1 to 8 carbon atoms is bound to a benzene ring; the polymer block B essentially comprises a conjugated diene compound unit;

at least the moiety of polymer block A can undergo crosslinking upon exposure to an active energy ray; and after molded into a desired shape, the composition is exposed to an active energy ray to carry out the crosslinking reaction.

(2) The polyolefin-based resin composition according to (1) above, wherein the alkylstyrene-derived structural unit (a) in which at least one alkyl group having 1 to 8 carbon atoms is bound to a benzene ring is a p-methylstyrene unit.

(3) The polyolefin-based resin composition according to (1) or (2) above, wherein the active energy ray is an electron beam.

(4) The polyolefin-based resin composition according to any one of (1) to (3) above, further containing a photopolymerization initiator.

(5) A molded article obtained from the polyolefin-based resin composition according to any one of (1) to (4) above.

(6) A laminate comprising a layer formed of the polyolefin-based resin composition according to any one of (1) to (4) above.

BEST MODE FOR CARRYING OUT THE INVENTION

The present invention will now be described in further detail.

The addition polymerization-based block copolymer (I) for forming the polyolefin-based resin composition of the present invention is selected from block copolymers comprising at least one polymer block A and at least one polymer block B, and the hydrogenated products thereof. The polymer block A essentially comprises an aromatic vinyl compound unit that contains at least 1% by mass of an alkylstyrene-derived structural unit (a) in which at least one alkyl group having 1 to 8 carbon atoms is bound to a benzene ring. The polymer block B essentially comprises a conjugated diene compound unit. At least the moiety of polymer block A can undergo crosslinking upon exposure to an active energy ray.

Examples of alkylstyrenes for forming the structural unit (a) of the polymer block A include o-alkylstyrene, m-alkylstyrene, p-alkylstyrene, 2,4-dialkylstyrene, 3,5-dialkylstyrene, and 2,4,6-trialkylstyrene with their alkyl groups having 1 to 8 carbon atoms, and halogenated alkylstyrenes in which one or more of the hydrogen atoms borne by the alkyl groups of the alkylstyrenes have been substituted with halogen atoms. Specific examples of the alkylstyrenes for forming the structural unit (a) include o-methylstyrene, m-methylstyrene, p-methylstyrene, 2,4-dimethylstyrene, 3,5-dimethylstyrene, 2,4,6-trimethylstyrene, o-ethylstyrene, m-ethylstyrene, p-ethylstyrene, 2,4-diethylstyrene, 3,5-diethylstyrene, 2,4,6-triethylstyrene, o-propylstyrene, m-propylstyrene, p-propylstyrene, 2,4-dipropylstyrene, 3,5-dipropylstyrene, 2,4,6-tripropylstyrene, 2-methyl-4-ethylstyrene, 3-methyl-5-ethylstyrene, o-chloromethylstyrene, m-chloromethylstyrene, p-chloromethylstyrene, 2,4-bis(chloromethyl)styrene, 3,5-bis(chloromethyl)styrene, 2,4,6-tri(chloromethyl)styrene, o-dichloromethylstyrene, m-dichloromethylstyrene, and p-dichloromethylstyrene.

The polymer block A may contain one or more units of the above-described alkylstyrenes and halogenated alkylstyrenes for forming the structural unit (a). Of these, p-methylstyrene unit and is particularly preferred as the structural unit (a), because it readily undergoes crosslinking and is readily commercially available.

Examples of the aromatic vinyl compound units other than those for forming the structural unit (a) include those formed of styrene, α-methylstyrene, β-methylstyrene, monofluorostyrene, difluorostyrene, monochlorostyrene, dichlorostyrene, methoxystyrene, vinylnaphthalene, vinylanthracene, indene, and acetonaphthylene. Of these, styrene and α-methylstyrene are particularly preferred.

The polymer block A of the addition polymerization-based block copolymer (I) forms hard segments of the thermoplastic elastomer. The alkyl groups, which are each bound to a benzene ring to form the structural unit (a), serve to introduce cross linkages in the hard segments of the polymer block A as they undergo the static crosslinking reaction upon exposure to an active energy ray.

The proportion of the structural unit (a) in the polymer block A is 1% by mass or more and, preferably, 10% by mass or more, and more preferably 40% by mass or more with respect to the mass of the polymer block A that forms the addition polymerization-based block copolymer (I) (or the total mass of the polymer blocks A when the addition polymerization-based copolymer (I) contains two or more polymer blocks A). The polymer block A may be made entirely of the structural unit (a). If the proportion of the structural unit (a) is less than 1% by mass, then the cross linkages are not introduced into the polymer block A to a sufficient degree, resulting in insufficient heat resistance and mechanical properties of the resulting polyolefin-based resin composition. In the polymer block A, the structural unit (a) and other aromatic vinyl compound units may be linked to one another either randomly, in blocks or in tapered blocks.

Preferably, the polymer block A is present in the addition polymerization-based block copolymer (I) in an amount of 10 to 40% by mass. If the amount of the polymer block A is less than 10% by mass, then insufficient crosslinking results, leading to insufficient heat resistance and mechanical properties. If the amount of the polymer block A is greater than 40% by mass, then the resulting polyolefin-based resin composition does not show sufficient flexibility.

When necessary, the polymer block A may include, along with the structural unit composed of the aromatic vinyl compound containing the structural unit (a), a small amount of structural units composed of other polymerizable monomers. The proportion of the structural unit composed of such other polymerizable monomers is preferably 30% by mass or less and, more preferably, 10% by mass or less based on the mass of the polymer block A that forms the addition polymerization-based block copolymer (1) (or the total mass of the polymer blocks A when the addition polymerization-based copolymer (I) contains two or more polymer blocks A). Examples of the other polymerizable monomers include 1-butene, pentene, hexene, butadiene, isoprene, and methyl vinyl ether.

Aside from the polymer block A composed of the aromatic vinyl compound unit containing the structural unit (a), the addition polymerization-based block copolymer (I) for use in the present invention may contain a polymer block composed of an aromatic vinyl compound that does not contain the structural unit (a).

The polymer block B of the addition polymerization-based copolymer (I) is composed essentially of a conjugated diene compound unit. Examples of the conjugated diene compounds include butadiene, isoprene, 2,3-dimethyl-1,3-butadiene, 1,3-pentadiene, and 1,3-hexadiene. The polymer block B may be composed solely of one of these conjugated diene compounds, or it may be composed of two or more of the conjugated diene compounds. The polymer block B is preferably composed of butadiene, isoprene, or a mixture of butadiene and isoprene. The polymer block B may have any microscopic structure, which may be present in any amount. When two or more conjugated dienes are used, they may be linked to one another either randomly, in blocks, in tapered blocks, or in combination of two or more of these manners of linking.

When necessary, the polymer block B may contain, along with the structural unit composed of the conjugated diene compound, a small amount of structural units composed of other polymerizable monomers. The proportion of such other polymerizable monomers is preferably 30% by mass or less and, more preferably, 10% by mass or less based on the mass of the polymer block B that forms the addition polymerization-based block copolymer (I) (or the total mass of the polymer blocks B when the addition polymerization-based copolymer (I) contains two or more polymer blocks B). Examples of the other polymerizable monomers include styrene, α-methylstyrene, and the aforementioned alkylstyrenes for forming the structural unit (a) (preferably, p-methylstyrene).

It is particularly preferred that the polymer block B be a polyisoprene block composed of isoprene units or a hydrogenated polyisoprene block in which some or all of the carbon-carbon double bonds originating from the isoprene units have been hydrogenated; a polybutadiene block composed of butadiene units or a hydrogenated polybutadiene block in which some or all of the carbon-carbon double bonds originating from the butadiene units have been hydrogenated; or a copolymer block composed of isoprene units and butadiene units or a hydrogenated copolymer block in which some or all of the carbon-carbon double bonds originating from the isoprene units or the butadiene units have been hydrogenated.

As far as the polymer block A and the polymer block B are linked to one another, they may be linked in any manner of linking, forming a straight-chained, branched or radial molecule of the addition polymerization-based block copolymer (I). Two or more of these manners of linking may be combined in one molecule. Preferably, the polymer block A and the polymer block B are linked together to form a straight-chained molecule. Examples of the straight-chained molecules include triblock copolymers as denoted by A-B-A, tetrablock copolymers as denoted by A-B-A-B and pentablock copolymers as denoted by A-B-A-B-A, given that "A" represents the polymer block A and "B" represents the polymer block B. Of these, triblock copolymers ("A-B-A") are particularly preferred because of their flexibility and readiness of the production of the addition polymerization-based block copolymer (I).

While the addition polymerization-based copolymer (I) for use in the present invention may have any number average molecular weight, it preferably has a number average molecular weight in the range of 30000 to 1000000, and more preferably in the range of 40000 to 300000. The term "number average molecular weight" as used herein refers to a number average molecular weight as determined by gel permeation chromatography (GPC) using polystyrene standards.

The addition polymerization-based copolymer (I) of the present invention can be produced, for example, by a known anionic polymerization technique. Specifically, the alkylstyrene for forming the structural unit (a), or a mixture of the alkylstyrene for forming the structural unit (a) and the aromatic vinyl compound, and the conjugated diene compound are sequentially polymerized to form a block copolymer (i.e., non-hydrogenated form of the addition polymerization-based block copolymer (I)). Using an initiator such as an alkyllithium compound, the reaction is carried out in n-hexane, cyclohexane, or other organic solvents that are inert to the polymerization.

When necessary, the resulting block copolymer is hydrogenated. The hydrogenation reaction is generally carried out in a saturated hydrocarbon solvent such as cyclohexane at a reaction temperature of 20 to 100° C. under a hydrogen pressure of 0.1 to 10 MPa and in the presence of a hydrogenation catalyst, resulting in a hydrogenated product of the addition polymerization-based block copolymer (I). Examples of such hydrogenation catalysts include Raney nickels; heterogeneous catalysts containing metals, such as Pt, Pd, Ru, Rh and Ni, carried by carbon, alumina, diatomite, and other suitable carriers; Ziegler catalysts containing an organic metal compound of, for example, cobalt, nickel and other group 9 or group 10 metals, combined with an organoaluminum compound or organolithium compound, such as triethylaluminum and triisobutylaluminum; and metallocene catalysts containing a bis(cyclopentadienyl) compound of transition metals, such as titanium, zirconium, and hafnium, combined with an organic metal compound, such as lithium, sodium, potassium, aluminum, zinc, magnesium or the like.

While the degree of hydrogenation may be adjusted depending on what physical properties are required of the polyolefin-based resin composition of the present invention, it is preferred that 70% of more, preferably 85% or more, and more preferably 95% or more of the carbon-carbon double bonds that result from the conjugated diene compound units of the polymer block B for forming the addition polymerization-based block copolymer (I) are hydrogenated when heat resistance, weather resistance, and ozone resistance are considered particularly important.

The degree of hydrogenation of the carbon-carbon double bonds that result from the conjugated diene compound units of the polymer block B can be determined by measuring the amount of the carbon-carbon double bonds in the polymer block B before the hydrogenation reaction and the amount after the hydrogenation reaction by means of iodimetry, IR spectrophotometry, nuclear magnetic resonance or other suitable techniques and taking the difference between these amounts.

Examples of the polyolefin resin (II) for forming the polyolefin-based resin composition of the present invention include homopolymers, such as high density polyethylene (HDPE), middle density polyethylene, low density polyethylene (LDPE), and polypropylene; ethylene-α-olefin copolymers, such as ethylene-propylene copolymer, ethylene-1-butene copolymer, ethylene-1-hexene copolymer, ethylene-1-heptene copolymer, ethylene-1-octene copolymer, ethylene-4-methyl-1-pentene copolymer, ethylene-1-nonene copolymer, and ethylene-1-decene copolymer; crosslinkable ethylene-based copolymers, such as ethylene-1,7-octadiene copolymer; and ethylene-vinyl acetate copolymers, ethylene-acrylic acid copolymers, ethylene-acrylate copolymers, ethylene-methacrylic acid copolymers and ethylene-methacrylate copolymers, and resins obtained by modifying these copolymers with maleic anhydride or the like. Of these, high density polyethylene, middle density polyethylene, low density polyethylene, polypropylene, ethylene-propylene copolymer, and ethylene-α-olefin copolymer are particularly preferred.

Preferably, the polyolefin-based resin composition of the present invention contains the addition polymerization-based copolymer (I) and the polyolefin-based resin (II) at a mass ratio of the addition polymerization-based copolymer (I) to the polyolefin-based resin (II) of 90/10 to 1/99 and, more preferably, 80/20 to 20/80. If the amount of the polyolefin-based resin (II) relative to the total mass of the addition polymerization-based block copolymer (I) and the polyolefin-based resin (II) is 10% by mass or less, or 99% by mass or more, then the resulting polyolefin-based resin composition often does not exhibit flexibility, heat resistance, mechanical properties, and solvent resistance in a well-balance manner.

In the polyolefin-based resin composition of the present invention, the active energy ray that is used to crosslink at least the moiety of polymer block A of the addition polymerization-based block copolymer (I) may be a particle beam, electromagnetic wave, and combination of these. Examples of the particle beam include electron beam (EB) and α-ray, and examples of the electromagnetic wave include ultraviolet ray (UV), visible light, infrared ray, γ-ray, and X-ray. Of these, electron beam (EB) and ultraviolet ray (UV) are particularly preferred.

These active energy rays can be irradiated using known apparatuses. The electron beam may be accelerated at a voltage of 0.1 to 10 MeV and irradiated at a dose of 1 to 500 kGy. A lamp with an irradiation wavelength of 200 to 450 nm may be preferably used as the source of ultraviolet ray (UV). Examples of the electron beam (EB) source include tungsten filament, and examples of the ultraviolet ray (UV) source include low-pressure mercury-vapor lamp, high-pressure mercury-vapor lamp, ultraviolet mercury lamp, carbon arc lamp, xenon lamp, and zirconium lamp.

When the active energy ray is irradiated to crosslink at least the moiety of polymer block A of the addition polymerization-based block copolymer (I) in the polyolefin-based resin composition of the present invention, it is not only the moiety of polymer block A that is crosslinked, but the moiety of polymer block B of the addition polymerization-based block copolymer (I) and the polyolefin-based resin (II) could also be partly crosslinked. However, such cross-linkages, if any, do not interfere with the object of the invention.

When necessary, and especially when ultraviolet ray (UV) is used as the active energy beam, a photopolymerization initiator is further added to the polyolefin-based resin composition of the present invention. Examples of such photopolymerization initiators include, but are not limited to, benzophenone, benzoin, benzoin methyl ether, benzoin ethyl ether, benzoin isopropyl ether, α-methylolbenzoin, α-methylolbenzoin methyl ether, α-methoxybenzoin methyl ether, benzoin phenyl ether, and α-t-butylbenzoin. These photopolymerization initiators may be used either individually or in combination of two or more photopolymerization initiators. While the photopolymerization initiator, when used, may be added to the polyolefin-based resin composition in any amount, it is preferably added in an amount of 0.01 to 5% by mass with respect to the total mass of the addition polymerization-based block copolymer (I) and the polyolefin-based resin (II).

When necessary, a crosslinking aid is further added to the polyolefin-based resin composition of the present invention. Examples of such crosslinking aids include triallyl isocyanulate, triallyl cyanulate, N,N'-phenylenebismaleimide, ethylene glycol di(meth)acrylate, propanediol di(meth)acrylate, butanediol di(meth)acrylate, hexanediol di(meth)acrylate, nonanediol di(meth)acrylate, and trimethylolpropane tri(meth)acrylate. These crosslinking aids may be used either individually or in combination of two or more crosslinking aids. While the crosslinking aid, when used, may be added to the polyolefin-based resin composition in any amount, it is preferably added in an amount of 0.01 to 5% by mass with respect to the total mass of the addition polymerization-based block copolymer (I) and the polyolefin-based resin (II).

When necessary, a softener is further added to the polyolefin-based resin composition of the present invention. Examples of such softeners include petroleum-based softeners, such as paraffin-, naphthene- or aromatic compound-based processed oils; liquid paraffin; and vegetable oil-based softeners, such as peanut oil and rosin. These softeners may be used either individually or as a mixture of two or more softeners. While the softener, when used, may be added to the polyolefin-based resin composition in any amount that does not interfere with the object of the present invention, it is typically added in an amount of 300 parts by mass or less, preferably 100 parts by mass or less, with respect to 100 parts by mass of the addition polymerization-based block copolymer (I).

A filler may be further added to the polyolefin-based resin composition of the present invention for the purpose of improving fillability, heat resistance, and rigidity of the composition. Examples of such fillers include talc, glass fiber, mica, kaolin, titanium oxide talc, clay, calcium silicate, glass, hollow glass sphere, calcium carbonate, magnesium carbonate, aluminum hydroxide, magnesium hydroxide, calcium aluminate, calcium hydroxide, zinc borate, dawsonite, polyammonium phosphate, hydrotalcites, silica, alumina, titanium oxide, iron oxide, zinc oxide, magnesium oxide, tin oxide, antimony oxide, barium ferrite, strontium ferrite, carbon black, graphite, carbon fiber, activated carbon, hollow carbon sphere, calcium titanate, silicon carbide, wood filler, starch or the like.

As long as the object of the present invention is not affected, various additives may be added to the polyolefin-based resin composition of the present invention, including thermostabilizers, photostabilizers, UV-absorbents, antioxidants, lubricants, coloring agents, antistats, flame retardants, blowing agents, water repellants, waterproof agents, fluorescent agents, anti-blocking agents, metal inactivating agents, antimicrobial agents, or the like.

As long as the object of the present invention is not affected, other polymers may be added to the polyolefin-based resin composition of the present invention for the purpose of improving flexibility and fluidity. Examples of such polymers include natural rubber, synthetic polyisoprene rubber, liquid polyisoprene rubber and hydrogenated products thereof, polybutadiene rubber, liquid polybutadiene rubber and hydrogenated products thereof, styrene-butadiene rubber, chloroprene rubber, ethylene-propylene rubber, acrylic rubber, butyl rubber, acrylonitrile-butadiene rubber, and styrene-based elastomers, such as polystyrene-polyisoprene-polystyrene block copolymer, polystyrene-polybutadiene-polystyrene block copolymer, hydrogenated products thereof or the like uke.

As long as the object of the present invention is not affected, a thermoplastic polyester resin, polyamide resin, polyphenylene ether resin, or other reinforcing resins having a relatively small molecular weight may be added to the polyolefin-based resin composition of the present invention for the purpose of ensuring the balance between the heat resistance, solvent resistance, and other properties of the composition.

Using a common tank-type mixer, high-speed stirrer, enclosed kneader, internal mixer or extruder, such as a single screw extruder and a twin screw extruder, the polyolefin-based resin composition of the present invention can be prepared by melting/mixing together the addition polymerization-based block copolymer (I), the polyolefin-based resin (II), and the optional photopolymerization initiator, crosslinking auxiliary, softener, and other optional components. The melting/mixing is carried out at 130° C. to 230° C. and, when necessary, in a nitrogen atmosphere. The resulting polyolefin-based resin composition may be formed into different forms depending on its intended applications and the manner of usage: it may be formed into blocks, granules, flakes, pellets, sticks, films, sheets, and other forms suitable for use in wire coatings, coatings of various cables, tubes, films, and sheets.

Upon the melting/mixing, maleic anhydride and a peroxide (such as dicumylperoxide, di-t-butylperoxide, and 2,5-dimethyl-2,5-di(t-butylperoxy)hexane) may further be added. In this manner, one or both of the addition polymerization-based block copolymer (I) and the polyolefin-based resin (II) are modified with maleic anhydride, so that the resulting polyolefin resin composition acquires an ability to disperse the filler and/or an ability to form a multilayer structure with, or adhere to, a polar resin, such as polyamide, polycarbonate, polybutylene terephthalate and polyethylene terephthalate.

The polyolefin-based resin composition obtained in the above-described manner is then molded by various molding techniques, such as injection molding (e.g., insert molding, double molding, sandwich molding, and gas injection molding), extrusion molding, inflation molding, T-die film molding, laminate molding, blow molding, hollow molding, compression molding, and calendering. Once molded/processed, the composition is irradiated with the active energy ray to form cross-linkages.

The molded/processed articles can be used in wire coatings, films, such as food wrapping film and fiber wrapping film, processed paper, pipes, sheets, stationeries, food containers, daily commodities, and other applications.

The so-obtained polyolefin-based resin composition is formed into a layer, which is laminated with a layer of other polyolefin-based resin, such as polypropylene, and when necessary, an adhesive layer or other layers to form a flexible laminate.

An adhesive resin may be added to the polyolefin-based resin composition preferably in an amount of 1 to 500 parts by mass to make the composition adhesive. The resin is then molded into, for example, a film to serve as an adhesive film. Examples of such adhesive resins include rosin-based resins, terpene-based resins, aliphatic petroleum resins, aromatic petroleum resins, alicyclic petroleum resins, coumarone and indene resins, styrene-based resins, alkylphenol resins, and xylene resins.

The present invention will now be described in further detail with reference to examples, which are not intended to limit the scope of the invention in any way.

In each of Examples and Comparative Examples described below, an exemplary polyolefin-based resin composition was evaluated for its hardness, mechanical properties (e.g., tensile strength at break and elongation at break), heat resistance, and solvent resistance. The evaluation was made according to the following methods.

1) Hardness

The hardness was measured according to the method described in JIS 6253. Specifically, three sheets (15 cm long× 15 cm wide×0.2 cm thick each) that were made of one of the polyolefin-based resin compositions obtained in Examples and Comparative Examples, were piled on top of one another and the hardness of the pile was measured using an ASTM D hardness meter as an index of the flexibility.

2) Mechanical Properties (e.g., Tensile Strength at Break and Elongation at Break)

The mechanical properties were measured according to the method described in JIS K 6251. Specifically, two No. 5 dumbbell-shape sample pieces were stamped out of a 15 cm long×15 cm wide×0.1 cm thick sheet that were made of one of the polyolefin-based resin compositions obtained in Examples and Comparative Examples and were stretched on an INSTRON universal tester at a rate of 500 mm/min, one at 23° C. and the other at 80° C., to determine the tensile strength at break (MPa) and the elongation at break (%) for each sample piece.

3) Heat Resistance 3-1) Residual Tensile Strength at Break and Residual Elongation at Break The residual tensile strength at break and residual elongation at break were measured according to the method described in Item No. 17 of JIS C 3005. Specifically, a 15 cm long×15 cm wide×0.1 cm thick sheet made of one of the polyolefin-based resin compositions obtained in Examples and Comparative Examples was left at 120° C. for 96 hours. Subsequently, a No. 5 dumbbell-shaped sample piece as specified by JIS K 6251 was stamped out of the sheet and was stretched on an INSTRON universal tester at a rate of 500 mm/min at 23° C. to determine the tensile strength at break (MPa) and the elongation at break (%). The residual tensile strength at break and the residual elongation at break were then determined by the following equations:

$$\text{Residual tensile strength at break (\%)}=100 \times F_1/F_0$$

where $F_0$=tensile strength at break (MPa) before heating; and $F_1$=tensile strength at break (MPa) after heating;

$$\text{Residual elongation at break (\%)}=100 \times L_1/L_0$$

where $L_0$=elongation at break (%) before heating; and $L_1$=elongation at break (%) after heating.

3-2) Heat Deformation

The heat-deformation was measured according to the method described in Item No. 23 of JIS C 3005. Specifically, a 3 cm long×1.5 cm wide sample piece was stamped out of a 15 cm long×15 cm wide×0.2 cm thick sheet made of one of the polyolefin-based resin compositions obtained in Examples and Comparative Examples. The sample piece, along with a heat deformation tester, was preheated at 150° C. for 30 minutes. The tester included two parallel plates and a 35 mm long rod (5 mm in radius) that had a semicircular cross-section and was arranged between the parallel plates. After the heating period, the sample piece was placed on the rod and was further left at the same temperature for 30 minutes while a 1 kg load was applied to the parallel plates. While the load was still applied, the thickness of the sample piece was measured and the heat deformation was determined by the following equation from the thickness of the sample piece after heating and the thickness before heating. A small heat deformation indicates that the composition has a high heat resistance.

$$\text{Heat deformation (\%)}=100 \times (M_0-M_1)/M_0$$

where $M_0$=thickness (mm) of the sample piece before heating; and $M_1$=thickness (mm) of the sample piece after heating.

3-3) Deformation Temperature

A No. 6 dumbbell-shaped sample piece as specified by JIS K 6251 was stamped out of a 15 cm×15 cm×0.1 cm sheet made of one of the polyolefin-based resin compositions obtained in Examples and Comparative Examples. The sample piece was suspended in an oven while a 72 g load was applied. The temperature in the oven was then raised at a rate of 3° C./min to the point at which the sample piece was stretched by 100%. This temperature was measured as an index of the heat resistance of the composition.

4) Toluene Extraction

A portion of the No. 5 dumbbell-shaped sample piece used in the measurement of mechanical properties was cut out and was precisely weighed to make a sample piece (approx. 0.3 g). The sample piece was placed in 30 ml toluene in a 50 ml screw tube. The tube was then agitated on an agitator at 25° C. for 12 hours. Subsequently, the sample piece was taken out from the tube and was dried at 100° C. for 180 minutes under a reduced pressure. The dried sample piece was weighed. The toluene extraction was determined by the following equation from the weight of the dried sample piece. The toluene extraction so obtained serves as an index of the solvent resistance of the composition.

Toluene extraction (%) $100 \times (A_0 - A_1)/A_0$ where $A_0$=mass (g) of the sample piece before test; and $A_1$=mass (g) of the sample piece after test.

REFERENCE EXAMPLE 1

39 kg cyclohexane and a 180 ml cyclohexane solution of sec-butyllithium (11% by mass) were placed in a pressure vessel equipped with a stirrer. To this solution, 1.32 kg of a mixture of p-methylstyrene and styrene (p-methylstyrene/styrene=50/50 (by mass)) were added over a 30-minute period and the polymerization was allowed to proceed at 50° C. for 60 minutes. Subsequently, 10.7 kg of a mixture of isoprene and butadiene (isoprene/butadiene=50/50 (by mass)) were added over a 60-minute period and the polymerization was allowed to proceed at 50° C. for 90 minutes. Additional 1.32 kg of the mixture of p-methylstyrene and styrene (p-methylstyrene/styrene=50/50 (by mass)) were added over a 30-minute period and the polymerization was allowed to proceed at 50° C. for 60 minutes. This gave a reaction mixture containing a poly(p-methylstyrene/styrene)-poly(isoprene/butadiene)-poly(p-methylstyrene/styrene) triblock copolymer. The resulting block copolymer had a number average molecular weight of 94000, and the total amount of p-methylstyrene and styrene as determined by $^1$H-NMR was 20% by mass.

To the resulting reaction mixture containing the block copolymer, a hydrogenation catalyst, which was separately prepared by adding 380 g of triisopropylaluminum (20% by mass, cyclohexane solution) to 56 g of nickel octanoate (64% by mass, cyclohexane solution), was added, and the hydrogenation reaction was allowed to proceed at 80° C. in a hydrogen atmosphere of 1 MPa. This gave a hydrogenated product of the poly(p-methylstyrene/styrene)-poly(isoprene/butadiene)-poly(p-methylstyrene/styrene) triblock copolymer (The product is referred to as "block copolymer (I)-1," hereinafter). The resulting block copolymer (I)-1 had a number average molecular weight of 100000, and the total amount of p-methylstyrene and styrene and the degree of hydrogenation as determined by $^1$H-NMR were 19% by mass and 97%, respectively.

REFERENCE EXAMPLE 2

39 kg cyclohexane and a 265 ml cyclohexane solution of sec-butyllithium (11% by mass) were placed in a pressure vessel equipped with a stirrer. To this solution, 2.25 kg of p-methylstyrene were added over a 30-minute period and the polymerization was allowed to proceed at 50° C. for 60 minutes. Following the addition of 100 ml tetrahydrofuran, 10.5 kg of butadiene were added over a 60-minute period and the polymerization was allowed to proceed at 50° C. for 90 minutes. Additional 2.25 kg of p-methylstyrene were added over a 30-minute period and the polymerization was allowed to proceed at 50° C. for 60 minutes. This gave a reaction mixture containing a poly p-methylstyrene-polybutadiene-poly p-methylstyrene triblock copolymer. The resulting block copolymer had a number average molecular weight of 80000, and the amount of p-methylstyrene as determined by $^1$H-NMR was 30% by mass.

To the resulting reaction mixture containing the block copolymer, a hydrogenation catalyst, which was separately prepared by adding 380 g of triisopropylaluminum (20% by mass, cyclohexane solution) to 56 g of nickel octanoate (64% by mass, cyclohexane solution), was added, and the hydrogenation reaction was allowed to proceed at 80° C. in a hydrogen atmosphere of 1 MPa. This gave a hydrogenated product of the poly p-methylstyrene-polybutadiene-poly p-methylstyrene triblock copolymer (The product is referred to as "block copolymer (I)-2," hereinafter). The resulting block copolymer (I)-2 had a number average molecular weight of 81000, and the amount of p-methylstyrene and the degree of hydrogenation as determined by $^1$H-NMR were 29% by mass and 97%, respectively.

REFERENCE EXAMPLE 3

39 kg cyclohexane and a 180 ml cyclohexane solution of sec-butyllithium (11% by mass) were placed in a pressure vessel equipped with a stirrer. To this solution, 1.32 kg of styrene were added over a 30-minute period and the polymerization was allowed to proceed at 50° C. for 30 minutes. Subsequently, 10.7 kg of a mixture of isoprene and butadiene (isoprene/butadiene=50/50 (by mass)) were added over a 60-minute period and the polymerization was allowed to proceed at 50° C. for 90 minutes. Additional 1.32 kg of styrene were added over a 30-minute period and the polymerization was allowed to proceed at 50° C. for 60 minutes. This gave a reaction mixture containing a polystyrene-poly(isoprene/butadiene)polystyrene triblock copolymer. The resulting block copolymer had a number average molecular weight of 94000, and the amount of styrene as determined by $^1$H-NMR was 20% by mass.

To the resulting reaction mixture containing the block copolymer, a hydrogenation catalyst, which was separately prepared by adding 380 g of triisopropylaluminum (20% by mass, cyclohexane solution) to 56 g of nickel octanoate (64% by mass, cyclohexane solution), was added, and the hydrogenation reaction was allowed to proceed at 80° C. in a hydrogen atmosphere of 1 MPa. This gave a hydrogenated product of the polystyrene-poly(isoprene/butadiene)polystyrene triblock copolymer (The product is referred to as "block copolymer 1," hereinafter). The resulting block copolymer 1 had a number average molecular weight of 100000, and the amount of styrene and the degree of hydrogenation as determined by $^1$H-NMR were 19% by mass and 97%, respectively.

REFERENCE EXAMPLE 4

39 kg cyclohexane and a 265 ml cyclohexane solution of sec-butyllithium (11% by mass) were placed in a pressure vessel equipped with a stirrer. To this solution, 2.25 kg of styrene were added over a 30-minute period and the polymerization was allowed to proceed at 50° C. for 30 minutes. Following the addition of 100 ml tetrahydrofuran, 10.5 kg of butadiene were added over a 60-minute period and the polymerization was allowed to proceed at 50° C. for 90 minutes. Additional 2.25 kg of styrene were added over a 30-minute period and the polymerization was allowed to proceed at 50° C. for 30 minutes. This gave a reaction mixture containing a polystyrene-polybutadiene-polystyrene triblock copolymer. The resulting block copolymer had a number average molecular weight of 80000, and the amount of styrene as determined by $^1$H-NMR was 30% by mass.

To the resulting reaction mixture containing the block copolymer, a hydrogenation catalyst, which was separately prepared by adding 380 g of triisopropylaluminum (20% by mass, cyclohexane solution) to 56 g of nickel octanoate (64% by mass, cyclohexane solution), was added, and the hydrogenation reaction was allowed to proceed at 80° C. in a hydrogen atmosphere of 1 MPa. This gave a hydrogenated product of the polystyrene-polybutadiene-polystyrene triblock copolymer (The product is referred to as "block copolymer 2," hereinafter). The resulting block copolymer 2 had a number average molecular weight of 81000, and the amount of styrene and the degree of hydrogenation as determined by $^1$H-NMR were 29% by mass and 97%, respectively.

EXAMPLES 1 THROUGH 6

In each of Examples 1 through 6, a polyolefin-based resin composition was obtained by melting and mixing the following components on a twin screw extruder: one of the block copolymer (I)-1 and the block copolymer (I)-2 obtained in Reference Examples 1 and 2, respectively; a polyolefin-based resin [PE1 or PE2 (PE1=NOVATEC LD EH30 (a low-density polyethylene manufactured by Japan Polychem Corporation, MFR (190° C., 2.16 kg load)=2.0 g/10 min); PE2=ULTZEX 1520L (a linear low-density polyethylene manufactured by Mitsui Chemicals Co., Ltd., MFR (190° C., 2.16 kg load)=2.3 g/10 min))]; and an antioxidant. These components were melted and mixed at 200° C. in respective proportions (by mass) shown in Table 1 below to give the polyolefin-based resin compositions of Examples 1 through 6. Each of the resulting polyolefin-based compositions was pressed (press temperature=200° C., press pressure=10 MPa, press time=3 min) to make two sheets, one sized 15 cm×15 cm×0.1 cm and the other sized 15 cm×15 cm×0.2 cm. The sheets were then irradiated with an electron beam at an accelerating voltage of 5.0 MeV and were irradiated at a dose of 200 kGy. The resulting sheets of each of the polyolefin-based resin compositions were evaluated for the different performances in the manner described above. The results are shown in Table 1 below.

TABLE 1

|  | Ex. 1 | Ex. 2 | Ex. 3 | Ex. 4 | Ex. 5 | Ex. 6 |
|---|---|---|---|---|---|---|
| (I) Addition polymerization-based block copolymer |  |  |  |  |  |  |
| (I)-1 | 20 | 20 | 50 | 50 |  |  |
| (I)-2 |  |  |  |  | 20 | 20 |
| (II) Polyolefin resin |  |  |  |  |  |  |
| PE1 | 80 |  | 50 | 50 | 80 |  |
| PE2 |  | 80 |  |  |  | 80 |
| Irganox 1010* | 0.1 | 0.1 | 0.1 | 0.1 | 0.1 | 0.1 |
| Electron beam dose (kGy) | 200 | 200 | 200 | 200 | 200 | 200 |
| Hardness (Type D) | 31 | 33 | 24 | 27 | 32 | 34 |
| Tensile strength at break (23° C., MPa) | 25 | 32 | 26 | 33 | 23 | 34 |
| Elongation at break (23° C., %) | 530 | 570 | 510 | 540 | 510 | 570 |
| Residual tensile strength at break (23° C., %) | 104 | 98 | —[1] | —[1] | 106 | 96 |
| Residual elongation at break (23° C., %) | 107 | 107 | —[1] | —[1] | 108 | 102 |
| Tensile strength at break (80° C., MPa) | 6.3 | 13 | 5.1 | 6.5 | 7.9 | 13 |
| Elongation at break (80° C., %) | 480 | 690 | 550 | 620 | 540 | 660 |
| Heat deformation (%) | 20 | 38 | —[1] | —[1] | 22 | 38 |
| Deformation temperature (° C.) | 238 | 242 | 222 | 238 | 186 | 204 |
| Toluene extraction (%) | 0 | 0 | 0 | 5 | 0 | 0 |

*Irganox 1010 (Product Name): Hindered phenol-based antioxidant, Ciba Specialty Chemicals Co., Ltd.
[1]N/A

COMPARATIVE EXAMPLES 1 THROUGH 6

The same polyolefin-based resin compositions as those used in Examples 1 through 6 were pressed to make sheets, which were directly subjected to evaluation of the same performances without electron beam irradiation. The results are shown in Table 2 below.

TABLE 2

|  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| (I) Addition polymerization-based block copolymer |  |  |  |  |  |  |
| (I)-1 | 20 | 20 | 50 | 50 |  |  |
| (I)-2 |  |  |  |  | 20 | 20 |
| (II) Polyolefin resin |  |  |  |  |  |  |
| PE 1 | 80 |  | 50 |  | 80 |  |
| PE 2 |  | 80 |  | 50 |  | 80 |
| Irganox 1010* | 0.1 | 0.1 | 0.1 | 0.1 | 0.1 | 0.1 |
| Electron beam dose (kGy) | 0 | 0 | 0 | 0 | 0 | 0 |
| Hardness (Type D) | 32 | 34 | 21 | 28 | 33 | 35 |
| Tensile strength at break (23° C., MPa) | 16 | 31 | 32 | 33 | 20 | 36 |
| Elongation at break (23° C., %) | 570 | 590 | 540 | 500 | 590 | 640 |
| Tensile strength at break (80° C., MPa) | 2.9 | 8.3 | 2.1 | 3.3 | 3.3 | 9.8 |
| Elongation at break (80° C., %) | 240 | 800 | 200 | 590 | 420 | 890 |
| Deformation temperature (° C.) | 94 | 100 | 92 | 96 | 95 | 101 |
| Toluene extraction (%) | 16 | 14 | 34 | 31 | 14 | 13 |

*Irganox 1010 (Product Name): Hindered phenol-based antioxidant, Ciba Specialty Chemicals Co., Ltd.)

COMPARATIVE EXAMPLES 7 THROUGH 12

In Comparative Examples 7 through 12, sheets were prepared from respective polyolefin-based resin compositions in the same manner as in Examples 1 through 6. The polyolefin-based resin compositions of Comparative Examples 7 through 12 are the same as those used in Examples 1 through 6, respectively, except that the block copolymer (I)-1 and the block copolymer (I)-2 obtained in Reference Examples 1 and 2 were replaced by the block copolymer 1 and the block copolymer 2 obtained in Reference Examples 3 and 4, respectively. The resulting sheets were evaluated for the same performances as describe above. The results are shown in Tables 3 and 4 below.

TABLE 3

|  | Comp. Ex. 7 | Comp. Ex. 8 | Comp. Ex. 9 | Comp. Ex. 10 |
| --- | --- | --- | --- | --- |
| (I) Addition polymerization-based block copolymer | | | | |
| 1 | 20 | 20 | 50 | 50 |
| 2 | | | | |
| (II) Polyolefin resin | | | | |
| PE1 | 80 | | 50 | |
| PE2 | | 80 | | 50 |
| Irganox 1010* | 0.1 | 0.1 | 0.1 | 0.1 |
| Electron beam dose (kGy) | 200 | 200 | 200 | 200 |
| Hardness (Type D) | 31 | 34 | 26 | 26 |
| Tensile strength at break (23° C., MPa) | 23 | 29 | 28 | 32 |
| Elongation at break (23° C., %) | 550 | 570 | 580 | 580 |
| Residual tensile strength at break (23° C., %) | 89 | 84 | —1) | —1) |
| Residual elongation at break (23° C., %) | 103 | 97 | —1) | —1) |
| Tensile strength at break (80° C., MPa) | 6.3 | 11 | 4.3 | 5.8 |
| Elongation at break (80° C., %) | 550 | 690 | 560 | 630 |
| Heat deformation (%) | 34 | 50 | —1) | —1) |
| Deformation temperature (° C.) | 128 | 220 | 136 | 192 |
| Toluene extraction (%) | 0 | 0 | 7 | 7 |

*Irganox 1010 (Product Name): Hindered phenol-based antioxidant, Ciba Specialty Chemicals Co., Ltd.
1)N/A

COMPARATIVE EXAMPLES 13 AND 14

In Comparative Examples 13 and 14, sheets were prepared from respective polyolefin-based resin compositions in the same manner as in Examples 1 through 6. The polyolefin-based resin compositions of Comparative Examples 13 and 14 were each composed only of one of the polyolefin-based resins (i.e., PE1 or PE2) and an antioxidant and did not contain any of the block copolymers obtained in Reference Examples 1 through 4. The resulting sheets were evaluated for the same performances as describe above. The results are shown in Table 4 below.

TABLE 4

|  | Comp. Ex. 11 | Comp. Ex. 12 | Comp. Ex. 13 | Comp. Ex. 14 |
| --- | --- | --- | --- | --- |
| (I) Addition polymerization-based block copolymer | | | | |
| 1 | | | | |
| 2 | 20 | 20 | | |
| (II) Polyolefin resin | | | | |
| PE1 | 80 | | 100 | |
| PE2 | | 80 | | 100 |
| Irganox 1010* | 0.1 | 0.1 | 0.1 | 0.1 |
| Electron beam dose (kGy) | 200 | 200 | 200 | 200 |
| Hardness (Type D) | 34 | 38 | 38 | 44 |
| Tensile strength at break (23° C., MPa) | 24 | 34 | 22 | 38 |
| Elongation at break (23° C., %) | 520 | 580 | 560 | 630 |
| Residual tensile strength at break (23° C., %) | 94 | 96 | failed | 73 |
| Residual elongation at break (23° C., %) | 108 | 103 | failed | 89 |
| Tensile strength at break (80° C., MPa) | 7.8 | 12 | 12 | 18 |
| Elongation at break (80° C., %) | 560 | 680 | 600 | 660 |
| Heat deformation (%) | 42 | 54 | 18 | 46 |
| Deformation temperature (° C.) | 106 | 206 | 105 | 208 |
| Toluene extraction (%) | 0 | 0 | 0 | 0 |

*Irganox 1010 (Product Name): Hindered phenol-based antioxidant, Ciba Specialty Chemicals Co., Ltd.

The results of Tables 1 and 2 indicate that the molded articles formed of the polyolefin-based resin compositions of Examples 1 through 6, which were each irradiated with the active energy ray and were crosslinked, exhibit superior mechanical properties, higher heat resistance, and higher solvent resistance as compared to the corresponding non-irradiated molded articles of Comparative Examples 1 through 6.

The results of Tables 1, 3 and 4 indicate that the molded articles formed of the respective polyolefin-based resin compositions of Examples 1 through 6 are more favorable, especially in terms of their heat resistance and solvent resistance, than the corresponding molded articles of the respective polyolefin-based resin compositions of Comparative Examples 7 through 12, each of which includes a block copolymer having its hard segment formed of blocks composed solely of styrene units. The molded articles formed of the respective polyolefin-based resin compositions of Examples 1 through 6 are more favorable than the corresponding molded articles formed of the respective polyolefin-based resins of Comparative Examples 13 and 14 especially in terms of their flexibility and heat resistance.

INDUSTRIAL APPLICABILITY

As set forth, the present invention provides a polyolefin-based resin composition that exhibits flexibility, heat resistance, mechanical properties, and solvent resistance in a well-balanced manner. Having such an advantageous feature, the polyolefin-based resin composition of the present invention can find effective application in a wide variety of products, including wire coatings, coatings of various cables, tubes, films, such as food-wrapping films and fiber-wrapping films, processed paper, pipes, sheets, stationeries, food containers, and daily commodities.

The invention claimed is:

1. A molded article, obtained by molding a resin composition into a shape and thereafter exposing the shape to an active energy ray to crosslink the resin composition, wherein the resin composition comprises an addition polymerization block copolymer (I) and a polyolefin resin (II), wherein:
    the addition polymerization block copolymer (I) is at least one copolymer selected from the group consisting of a block copolymer comprising at least one polymer block A and at least one polymer block B and a hydrogenated product thereof;
    the polymer block A comprises an aromatic vinyl compound unit comprising at least 1% by mass of an alkylstyrene-derived structural unit (a) in which at least one alkyl group having 1 to 8 carbon atoms is bound to a benzene ring; and the polymer block B comprises a conjugated diene compound unit, wherein 70% or more of the carbon-carbon double bonds of the polymer block B are hydrogenated; and at least the moiety of polymer block A can undergo crosslinking upon exposure to an active energy ray, wherein the polyolefin resin (II) is at least one polyolefin selected from the group consisting of a high density polyethylene, a middle density polyethylene, a low density polyethylene and an ethylene-α-olefin copolymer, and the addition polymerization block copolymer (I) and the polyolefin resin (II) are present in a mass ratio of 90/10 to 1/99.

2. The molded article according to claim 1, wherein the alkylstyrene-derived structural unit (a) in which the at least one alkyl group having 1 to 8 carbon atoms that is bound to a benzene ring is a p-methylstyrene unit.

3. The molded article according to claim 1, wherein the active energy ray is an electron beam.

4. The molded article according to claim 2, wherein the active energy ray is an electron beam.

5. The molded article according to claim 1, wherein the resin composition further comprises a photopolymerization initiator.

6. The molded article according to claim 2, wherein the resin composition further comprises a photopolymerization initiator.

7. The molded article according to claim 1, wherein the polymer block A further comprises an aromatic vinyl compound unit comprising at least one of styrene and α-methylstyrene.

8. The molded article according to claim 1, wherein the polymer block A comprises at least 40% by mass of said alkylstyrene-derived structural unit (a).

9. The molded article according to claim 1, wherein the polymer block A is present in said addition polymerization block copolymer (I) in an amount of 10 to 40% by mass.

10. The molded article according to claim 1, wherein the conjugated diene compound of polymer block B comprises at least one butadiene and isoprene.

11. The molded article according to claim 1, wherein the addition polymerization block copolymer (I) has a number-average molecular weight of from 40,000 to 300,000.

12. The molded article according to claim 1, wherein the addition polymerization block copolymer (I) and the polyolefin resin (II) are present in a mass ratio of 80/20 to 20/80.

13. The molded article according to claim 1, wherein the polyolefin resin (II) is at least one polyolefin selected from the group consisting of a high density polyethylene, a middle density polyethylene and a low density polyethylene.

14. A method for making a molded article, comprising:

molding a resin composition into a desired shape; then, after the molding crosslinking the resin composition by exposing the resin composition to an active energy ray;

wherein the resin composition comprises an addition polymerization block copolymer (I) and a polyolefin resin (II);

wherein the addition polymerization block copolymer (I) is a block copolymer comprising at least one polymer block A and at least one polymer block B, and the hydrogenated products thereof;

wherein the polymer block A comprises an aromatic vinyl compound unit comprising at least 1% by mass of an alkylstyrene-derived structural unit (a) in which at least one alkyl group having 1 to 8 carbon atoms is bound to a benzene ring, and the polymer block B comprises a conjugated diene compound unit, wherein 70% or more of the carbon-carbon double bonds of the polymer block B are hydrogenated;

wherein at least the alkylstyrene-derived structural unit (a) of the polymer block A can undergo crosslinking upon exposure to an active energy ray;

wherein the polyolefin resin (II) is at least one selected from the group consisting of a high density polyethylene, a middle density polyethylene, a low density polyethylene, a polypropylene, an ethylene-propylene copolymer, and an ethylene-α-olefin copolymer; and wherein the addition polymerization block copolymer (I) and the polyolefin resin (II) are present in a mass ratio of 90/10 to 1/99.

15. The molded article according to claim 1, wherein the polymer block A of the addition polymerization block copolymer (I) is not hydrogenated.

16. The method according to claim 14, wherein the polymer block A of the addition polymerization block copolymer (I) is not hydrogenated.

17. The molded article according to claim 1, wherein 95% of the carbon-carbon double bonds are hydrogenated in polymer block B.

18. The method of claim 14, wherein 95% of the carbon-carbon double bonds are hydrogenated in polymer block B.

19. The molded article according to claim 1, wherein the polymer block A comprises units of styrene and an alkyl substituted styrene.

20. The method of claim 14, wherein the polymer block A comprises units of styrene and an alkyl substituted styrene.

* * * * *